Aug. 29, 1939.

F. H. RICHTERKESSING 2,171,278

VEHICLE CONTROLLED SELECTIVE SYSTEM

Original Filed July 29, 1932

INVENTOR
FRANK H RICHTERKESSING
BY
John L. Milton
ATTORNEY

Patented Aug. 29, 1939

2,171,278

UNITED STATES PATENT OFFICE 2,171,278

VEHICLE-CONTROLLED SELECTIVE SYSTEM

Frank H. Richterkessing, Louisville, Ky., assignor to Cheatham Electric Switching Device Co., Incorporated, a corporation of Kentucky, and Nachod & United States Signal Co., Incorporated, Louisville, Ky., a corporation of Kentucky Original application July 29, 1932, Serial No. 626,241, now Patent No. 2,092,021, dated September 7, 1937. Divided and this application August 10, 1937, Serial No. 158,362

8 Claims. (Cl. 246—227)

The present application is a division of my parent application Ser No. 626,241, filed on July 29, 1932, and entitled Speed selective control system, which application issued on September 7, 1937, as Letters Patent No. 2,092,021.

The invention in the present application primarily relates to improvements in a selective system, whereby the operator of a vehicle may selectively determine the operation of a mechanism according to the speed at which he operates the vehicle in passing an actuating device.

Other embodiments of this principal of operation, are illustrated in my parent application referred to at the outset, and my co-pending divisional application S. N. 158,361, filed on August 10, 1937, and entitled Selective control system.

Each of the foregoing applications embrace certain fundamental principles of circuit design that may be employed to provide an efficient and low cost apparatus for accomplishing selection according to the speed at which a vehicle is operating.

An additional object of the present invention is to provide for both selection and operation while the vehicle is operating the actuating device.

Heretofore, the common method of providing selective operation, depended upon the use of "power on" or "power off" the operating motors of a vehicle. While this method of selection is fairly satisfactory, for vehicles deriving propulsion current from an auxiliary conductor, its use is necessarily limited to such vehicular operation. Obviously, since the "power on" and "power off" method of selection requires certain relays of the wayside apparatus to be connected in series with the circuits of the operating motors of the vehicle, such method of selection is not applicable to controls operated by vehicles propelled by self-contained power systems.

Other changes in operating conditions have also rendered the well known "power on" and "power off" system of selection impracticable. For instance, the current consumed by the auxiliaries, of electric railway vehicles, have been increased to such an extent that the narrow margin, between the auxiliary currents and the motor operating currents, no longer provides satisfactory selection. In fact, in some instances the auxiliary currents have practically equaled the motor currents. Also, the use of the "power on" and "power off" principle of selection on steep grades has proven to be impractical, as it is difficult for the operator of a vehicle to shut-off power, to the vehicle motors, and "coast" uphill. Similarly the use of motor current "downhill" for selection encounters difficulties through the regeneration of the vehicle motors.

Accordingly, the principal object of this invention is to provide a system that will effect one operation, when a vehicle operates at a speed less than a certain predetermined amount, and which will effect a different operation, when the vehicle operates at a speed greater than the predetermined amount.

Another object of this invention is to provide a system that will supply a definite time of current application after selection has been completed.

A still further object of this invention is to provide a system in which the speed of the vehicle is effective only while the device controlling selection is actuated.

Other and further objects, and changes of the present invention, will be manifest to those conversant with the subject, when the present disclosure is considered in connection with my several co-pending applications referred to hereinbefore.

These objects are attained by the apparatus illustrated in the accompanying drawing, in which—

Figures 1, 2:
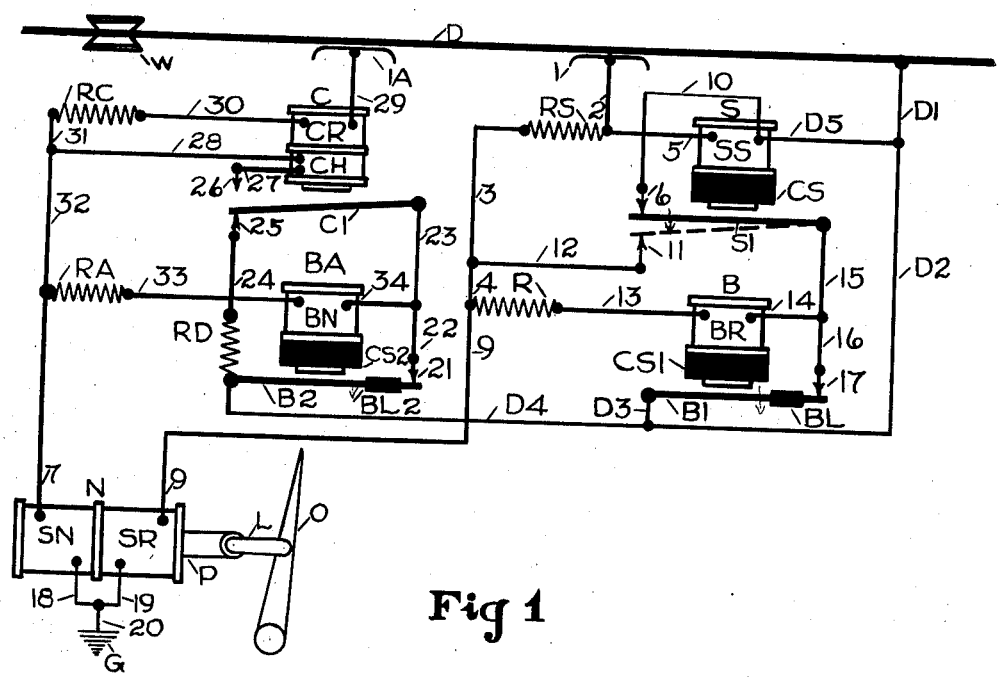
Figure 1 illustrates an embodiment of my invention as applied to the selective control of a mechanism operating a switch point.
Fig. 2 is a modification of Fig. 1, in which the circuits and apparatus controlled by the selective relay illustrate another method of providing a definite time of current application after selection has been completed.

With reference to Fig. 1, the character O designates a switch tongue, which is electro-magnetically operated by solenoids SN and SR. The reciprocating plunger P, operating within solenoids SN and SR, mechanically connects switch tongue O through link L. Although the switch tongue is illustrated in the "reverse" position, it must be understood that it may be illustrated normally in either of its operable positions. It is to be further understood that, while I have illustrated the solenoids SN and SR operating a switch tongue, such solenoids may be proportioned according to the amount of work to be accomplished, and employed to operate various types of mechanisms and circuit controlling devices.

The character D designates a current conductor or overhead trolley wire. Positioned adjacent the conductor D is represented an actuating device or trolley contactor, consisting of a contact member I that is arranged to be engaged by a current collector W of a vehicle. It is to be understood that, although I have illustrated the contact member as being engaged by a current collector, such contact member may be of any construction to provide the equivalent operation as a vehicle passes a given point.

In the present embodiments of my invention, I have also illustrated a second contact member 1A, with associate control apparatus, for energizing solenoid SN for a predetermined time regardless of the speed with which the current collector passes the contact member 1A.

The relay C is provided with an operating coil CR and a holding coil CH, which control an armature C1 operating between contacts 25 and 26.

The relay BA is provided with an operating coil BN and an armature B2 normally engaging a contact 21 located within a magnetic blowout, symbolically represented by BL2. The relay BA is of the slow release type, and is provided with means, symbolically represented by CS2, for retarding the release of its armature B2 upon deenergization of its operating coil BN. It is well known to those familiar with the art that many methods may be employed to retard the release of an armature, such as an oil dash pot, a copper or brass sleeve about the core of the relay, a mechanical inertia device, or any combination of the latter.

The relay B is provided with an operating coil BR and an armature B1 normally engaging a contact 17 located within a magnetic blowout, symbolically represented by BL. The relay B is also of the slow release type, and is accordingly constructed similar to that outlined for relay BA.

The relay S is a slow release relay, and is provided with an operating coil SS and an armature S1 operating between contacts 6 and 11. The relay S is provided with means, symbolically represented by CS, for retarding the release of armature S1. It is apparent that this device may be of the same character described for relay BA.

Resistance units RC, RA, RS and R may be of any of the conventional forms ordinarily employed in electrically controlled apparatus to limit the amount of current in a circuit.

With further reference to Fig. 1, it will be apparent that, when the current collector engages the contact member 1 for a predetermined time, the selective relay S and relay B will operate to energize solenoid SR. However, should the current collector engage contact member 1 for a shorter time, the solenoid SR will not be energized. When the current collector engages contact member 1A, irrespective of the time of contact engagement therewith, the solenoid SN will be energized for a predetermined time interval.

In the particular embodiment of my invention, illustrated in Fig. 1, the operating coil SS is normally energized, thereby retaining armature S1 normally in contact engagement with contact 6. The circuit for normally energizing operating coil SS being completed from the current conductor D, through wire D1, wire D5, operating coil SS, wire 5, resistance unit RS, wire 3, wire 4, wire 9, solenoid SR, wire 19, wire 20 to ground G. It is to be understood that the current flowing in the latter circuit is not sufficient to energize solenoid SR.

The operating coil of relay BR is likewise normally energized, thereby retaining its armature B1 in contact engagement with contact 17. The circuit for the energization of operating coil BR being completed from the current conductor D, through wire D1, wire D5, wire 10, contact 6, armature S1, wire 15, wire 14, operating coil BR, wire 13, resistance unit R, wire 9, solenoid SR, wire 19, wire 20 to ground G. It will also be noted that operating coil BR is connected to the current conductor D through wires D1, D2, D3, armature B1, front contact 17, wire 16, and wire 14. From the foregoing it will be apparent that operating coil BR will remain energized through either of the circuits just described. It must also be understood that the current flowing through the circuit of operating coil BR is very small, and not sufficient to energize solenoid SR.

When the current collector W engages contact member 1, operating coil SS is de-energized through a shunt circuit established by the contact engagement of the current collector and contact member 1. The de-energization of operating coil SS does not result in armature S1 immediately disengaging front contact 6, since the armature S1 is provided with means for retarding its release, as previously described. Therefore, the current collector must engage contact member 1 for a sufficiently long period before armature S1 disengages contact 6. Assuming, therefore, that the current collector engages contact member for a sufficiently long period, the armature S1 will disengage contact 6 and engage contact 11, thereby establishing a circuit for conducting energization current to solenoid SR. The latter circuit being completed from the current conductor D, through wire D1, wire D2, wire D3, armature B1, contact 17, wire 16, wire 15, armature S1, contact 11, wire 12, wire 4, wire 9, solenoid SR, wire 19, wire 20 to ground G. It is to be noted that the circuits are arranged so that as soon as energization current is directed to solenoid SR, the operating coil SS is further shunted by placing wire 9 at positive potential. Similarly, the operating coil BR is shunted through the establishment of wire 9 at positive potential, since each of the operating coils SS and BR obtain their ground connection through wire 9 and solenoid SR. Placing wire 9 at positive potential, deenergizes operating coil BR. The de-energization of operating coil BR does not result in armature B1 instantly disengaging contact 17, since the armature is provided with means for retarding its release, as heretofore described. Therefore, after a predetermined time, armature B1 disengages contact 17, and thereby discontinues the flow of energization current to solenoid SR. As long as the current collector continues to engage contact member 1, after armature B1 has discontinued the flow of energization current to solenoid SR, armature B1 will be prevented from returning into contact engagement with contact 17, since the disengagement of armature S1 and contact 6, and the disengagement of armature B1 and contact 17, retains the operating coil BR disconnected from the current conductor D. Accordingly, this arrangement of circuits will provide a flow of energization current to solenoid SR for only a predetermined time, when the contact member 1 is engaged by the current collector W in the manner just described. It is apparent, therefore, that continued engagement of the current collector with contact member 1 will not cause energization current to be applied to solenoid SR for an excessive time, and produce solenoid burnouts. It is well known to those familiar with the art, that in order to obtain sufficient power in track switch solenoids, the solenoids must be considerably overloaded during their operation.

As soon as the current collector disengages the contact member 1, the shunt through wire 2 on operating coil SS is removed, thereby restoring operating coil S to its normally energized condition. The re-energization of operating coil SS restores armature S1 into engagement with contact 6, and accordingly completes the pick up circuit through wire 15 for re-energizing operating coil BR. From the foregoing it will be apparent that, should the current collector engage the contact member 1 for a time less than the predetermined amount, armature S1 will not release, therefore solenoid SR will not be energized.

As heretofore mentioned, the relays C and BA are provided for controlling the energization of solenoid SN. It will be noted that operating coil BN is normally energized; the circuit therefor being completed from the trolley conductor D, through wire D1, wire D2, wire D4, armature B2, contact 21, wire 22, wire 34, operating coil BN, wire 33, resistance unit RA, wire 7, solenoid SN, wire 18, wire 20 to ground G. It will also be noted that the circuits of operating coil BN are arranged so that the operating coil BN will be connected to positive potential from wire D4, through resistance unit RD, wire 24, contact 25, armature C1, wire 23, and wire 34, during the time required to raise armature B2 into engagement with contact 21. Therefore, the circuit just described through resistance unit RD, is the pick up circuit for relay BA, while the circuit previously described through armature B2 and contact 21, is a stick circuit for retaining operating coil BN energized.

When the vehicle advances, and the current collector W engages contact member 1A, a circuit is established for energizing operating coil CR. The circuit for energizing operating coil CR being completed from the trolley conductor D through the current collector W to contact member 1A, through wire 29, operating coil CR, wire 30, resistance unit RC, wire 21, wire 32, wire 7, solenoid SN, wire 18, wire 20 to ground G. It is to be understood that the current flowing in the latter circuit is not sufficient to energize solenoid SN. The energization of operating coil CR resulted in armature C1 disengaging contact 25 and engaging contact 26. Incident to the engagement of armature C1 and contact 26, a circuit is completed for conducting energization current to solenoid SN. The latter circuit being completed from the current conductor D through wire D1, wire D2, wire D4, armature B2, contact 21, wire 22, wire 23, armature C1, contact 26, wire 27, low resistance holding coil CH, wire 28, wire 32, wire 7, solenoid SN, wire 18, wire 20 to ground G. It is to be noted that the holding coil CH is placed in series with the circuit conducting energization current to the solenoid SN. This feature provides for the retaining of armature C1 in engagement with contact 26 as long as energization current flows to the solenoid SN, even though the current collector W disengages contact member 1A.

As previously described, the operating coil BN is normally energized. Therefore, directing energization current to solenoid SN through wire 7, places wire 7 at positive potential, which accordingly de-energizes operating coil BN. The de-energization of operating coil BN does not result in armature B2 instantly disengaging contact 21, since armature B2 is provided with means for retarding its release. Therefore, after a predetermined time, armature B2 disengages contact 21, thereby discontinuing the flow of energization current to solenoid SN. Should the current collector W remain in engagement with contact member 1A, after the release of armature B2, the operating coil BN will not be permitted to re-energize even though the shunt circuit through wire 7 is removed. Obviously, the disengagement of armature B2 and contact 21, and the retaining of armature C1 out of engagement with contact 25, maintains the operating coil BN disconnected from the current conductor D. As soon, however, as the current collector disengages contact member 1A, and armature B2 disengages contact 22, a circuit is established for the energization of operating coil BN. The latter circuit being completed from the current conductor D, through wire D2, wire D4, resistance unit RD, wire 24, contact 25, armature C1, wire 23, wire 34, operating coil BN, wire 33, resistance unit RA, wire 7, solenoid SN, wire 18, wire 20, to ground G. The re-energization of operating coil BN, in the manner just described, restores the apparatus for controlling solenoid SN to normal.

The control illustrated in Fig. 2, is a modification of the system described and illustrated in Fig. 1.

With reference to Fig. 2, it will be noted that the operating coil BN, of retarded release relay BA, is normally energized. The latter circuit being completed from the trolley conductor D, through wire D1, wire D3, wire D4, armature C2, contact 4, wire 5, operating coil BN, wire 33, resistance unit R1, resistance unit R2, wire 23, wire 7, solenoid SN, wire 18, wire 20 to ground G. It will also be apparent that, when the current collector W engages contact member 1A, a circuit is completed for energizing operating coil CR. The latter circuit being completed from the current conductor D through the current collector W to contact member 1A, through wire 29, operating coil CR, wire 3, resistance unit R2, wire 23, wire 7, solenoid SN, wire 18, wire 20 to ground G. It is to be understood that the currents flowing through the circuits of operating coils BN and CR are very small, and accordingly are not sufficient to energize solenoid SN.

Incident to the energization of operating coil CR, armature C2 disengaged contact 4 and engaged contact 34, thereby establishing a circuit for conducting energization current to solenoid SN. The latter circuit being completed from the current conductor D through wire D1, wire D3, wire D4, armature C2, contact 34, wire 35, low resistance holding coil CH, wire 36, armature B2, contact 21, wire 22, wire 7, solenoid SN, wire 18, wire 20 to ground G. It will be noted that the low resistance holding coil CH is placed in series with the circuit conducting energization current to solenoid SN. Therefore, as long as energization current flows to solenoid SN, the holding coil CH will retain armature C2 in engagement with contact 34. The disengagement of armature C2 and contact 4, opened the circuit of operating coil BN. However, the resultant de-energization of operating coil BN did not result in armature B2 instantly disengaging front contact 21, since the armature B2 is provided with a retarded release device of the character hereinbefore discussed. Therefore, after a predetermined time, armature B2 will disengage contact 21, thereby discontinuing the flow of energization current to solenoid SN.

With further reference to Fig. 2, it will be apparent that, if the current collector continues to engage contact member 1A after armature B2 disengages contact 21, the operating coil BN will be retained de-energized, since the disengagement of armature C2 and contact 4 retains the circuit of operating coil BN opened. As soon, however, as the current collector disengages contact member 1A, armature C2 will re-engage contact 4, and thereby re-establish the circuit of operating coil BN. The re-energization of operating coil BN will raise armature B2 into engagement with contact 21, thereby restoring the circuits and relays for controlling solenoid SN to normal.

To provide for the control of solenoid SR, in Fig. 2, I employ two normally energized relays B and S. The circuit normally retaining the operating coil SS of relay S energized, being completed from the trolley conductor D, through wire D1, wire D2, operating coil SS, wire 38, resistance unit RS, wire 37, wire 39, wire 9, solenoid SR, wire 19, wire 20 to ground G. The circuit for retaining the operating coil BR of relay B energized, being completed from the trolley conductor D, through wire D1, wire D3, armature S1, contact 6, wire 10, operating coil BR, wire 13, resistance unit R, wire 39, wire 9, solenoid SR, wire 19, wire 20 to ground G. It is to be understood that the currents flowing through the operating coils SS and BR are very small, and are not sufficient to energize solenoid SR.

When the vehicle advances, and the current collector W engages contact member 1, wire 38 is placed at positive potential, thereby de-energizing operating coil SS. The de-energization of operating coil SS did not result in armature S1 instantly disengaging from contact 6, since the armature S1 is provided with a retarded release device of the character hereinbefore discussed. Should the current collector engage contact member 1 for a comparatively short period, armature S1 will not disengage contact 6. If, however, the current collector engages contact member 1 for a sufficiently long period, armature S1 will disengage contact 6, and come into engagement with contact 11. The engagement of armature S1 and contact 11 establishes a circuit for conducting energization current to solenoid SR. The latter mentioned circuit being completed from the current conductor D, through wire D1, wire D3, armature S1, contact 11, wire 12, armature B1, contact 17, wire 16, wire 9, solenoid SR, wire 19, wire 20 to ground G. It will be noted that the directing of energization current to solenoid SR through wire 9, placed wire 9 at positive potential, which will accordingly retain operating coil SS de-energized as long as energization current is directed to solenoid SR.

The disengagement of armature S1 and contact 6 opened the circuit of operating coil BR. The resultant de-energization of operating coil BR did not result in armature B1 instantly disengaging its front contact 17, since the armature B1 is provided with a retarded release device of the character hereinbefore described. Therefore, after a predetermined time, armature B1 will disengage contact 17, and thereby discontinue the flow of energization current to solenoid SR. It will be further apparent that, should the current collector W continue to engage contact member 1 after armature B1 disengages contact 17, operating coil BR will be prevented from being re-energized, since the disengagement of armature S1 and contact 6 retains the circuit of operating coil BR open. Therefore, as soon as the current collector disengages contact member 1, operating coil SS will re-energize, and restore armature S1 into engagement with contact 6. The restoration of armature S1 into engagement with contact 6 will accordingly re-establish the circuit for energizing operating coil BR, which in turn will restore armature B1 into engagement with contact 17, thereby restoring the circuits and relays controlling solenoid SR to normal.

While the foregoing description and drawing illustrate my invention as being applied to the control of an electrically operated track switch, it is understood that the control has been effectively employed to selectively operate signals. Such modifications of my invention, as applied to the control of signals, are numerous, and have not been illustrated since it is believed it will be apparent to those familiar with the art the various uses my invention has in connection with the selective control of signals. Therefore, claims commensurate with the scope of this disclosure are not to be restricted to the specific arrangement and modifications shown in the accompanying drawing. Having thus described my invention, I claim:

1. In a track switch operating system comprising, a trolley contact adjacent a trolley wire and closed by a current collector as the collector passes the said trolley contact during its movement along the trolley wire; a source of power; a track switch; electrically controlled operating means for the said track switch having one terminal thereof connected to one terminal of the said source of power; means for connecting the other terminal of the said track switch operating means to the other terminal of the said source and having a normally open switch S1—11 included therein; a normally energized operating coil SS for the switch S1—11; means permanently connecting the said coil SS to the source of power; and means connecting the said operating coil SS, and including the said trolley contact, for shunting the said operating coil SS, when the said current collector closes the said trolley contact, thereby deenergizing the said operating coil, and closing the switch S1—11 to connect the said other terminal of the switch operating means to the said other terminal of the said source.

2. In a track switch operating system comprising, a trolley contact adjacent a trolley wire and closed by a current collector as the collector passes the said trolley contact during its movement along the trolley wire; a source of power; a track switch; electrically controlled operating means for the said track switch; an operating circuit for said track switch operating means; a normally open switch S1—11 and a normally closed switch B1—17 included in the said circuit; a normally energized operating coil SS for the switch S1—11, and a normally energized operating coil BR for the switch B1—17; means connecting the said operating coil SS and including the said trolley contact for shunting the said operating coil SS, when the said current collector closes the said trolley contact, thereby de-energizing the operating coil SS and closing the switch S1—11 to establish a flow of current in the said operating circuit; and means, responsive to the closing of the switch S1—11, for de-energizing the operating coil BR, thereby opening switch B1—17 and discontinuing the flow of operating current in the said operating circuit.

3. In a track switch operating system comprising, a trolley contactor having a contact member 1 to be engaged by a current collector; a source of power; a track switch N; electrically controlled operating means SR for the said track switch N; an operating circuit for directing current to the said track switch operating means; a time element relay S, actuated in response to the engagement of the current collector and contact member 1, to establish a flow of operating current in the said operating circuit; a second time element relay B, operating a predetermined time after the actuation of the said relay S, to discontinue the said flow of operating current in the said operating circuit; an operating coil BR for the last mentioned relay; a circuit for initially connecting the operating coil BR to the said source of power, including an armature S1 and a contact 6 of the first mentioned relay S; and a second circuit for retaining the said operating coil BR connected to the said source of power, including an armature B1 and front contact 17 of the second mentioned relay B.

4. A relay control system comprising, a trolley contactor having a contact member to be electrically engaged by a current collector; a source of power; a mechanism to be selectively operated; electrically controlled operating means for the said mechanism; an operating circuit for directing current to the operating means of the said mechanism; a switch normally maintaining the operating circuit disconnected from the source of power and operable to connect the said circuit to the source of power to establish a flow of operating current in the said operating circuit; means providing an operation of the said switch, only when the current collector maintains continuous electrical engagement with the contact member for a predetermined time; and means, operating a predetermined time after the operation of the said switch, to discontinue the said flow of operating current in the said operating circuit.

5. A relay control system comprising, an actuating member adapted to be operated by a vehicle; a source of power; a mechanism to be selectively operated; electrically controlled operating means for the said mechanism; an operating circuit for directing current to the operating means of the said mechanism; a switch normally maintaining the operating circuit disconnected from the source of power and operable to connect the said circuit to the source of power to establish a flow of operating current in the said operating circuit; means providing an operation of the said iswitch, only when the said actuating member is continuously operated for a predetermined time, and not otherwise; and means operating to discontinue the flow of current in the said operating circuit a predetermined time after the operation of said switch.

6. In a selectively operated relay system comprising, a normally open contact closed by a vehicle, while the said vehicle is passing over a particular portion of its path of travel; a source of power; a mechanism to be selectively operated or not operated; electrically controlled operating means for the said mechanism; an operating circuit for directing current to the said operating means; a switch normally disconnecting the operating circuit from the said source of power and operable to connect the said circuit to the source of power to establish a flow of operating current in the said operating circuit; and means providing an operation of the said switch, when the said contact is continuously closed for a predetermined time, and not otherwise.

7. A relay control system comprising, a trolley contactor having a contact member to be engaged by a current collector; a source of power; a mechanism to be selectively operated or not operated; electrically controlled operating means for the said mechanism; an operating circuit for directing current to the operating means of the said mechanism; a switch normally maintaining the operating circuit disconnected from the source of power; means, responsive to the engagement of the current collector with the said contact member, providing an operation of the said switch to connect the said operating circuit to the source of power, and to thereby establish a flow of operating current in the said operating circuit, only when the said current collector continuously engages the said contact member for a predetermined time, and not otherwise; and means, operating a predetermined time after the operation of the said switch, to discontinue the flow of current in the said operating circuit.

8. A relay control system comprising, a trolley contactor having a contact member to be engaged by a current collector; a source of power; a mechanism to be selectively operated or not operated; electrically controlled operating means for the said mechanism; an operating circuit for directing current to the operating means of the said mechanism; a switch normally maintaining the operating circuit disconnected from the source of power; means, responsive to the engagement of the current collector with the said contact member, providing an operation of the said switch to connect the said operating circuit to the source of power, and to thereby establish a flow of operating current in the said operating circuit, only when the said current collector continuously engages the said contact member for a predetermined time, and not otherwise; and means, operating as long as current is flowing in the said operating circuit, to retain the said switch operated.

FRANK H. RICHTERKESSING.